(12) United States Patent
Marsh et al.

(10) Patent No.: US 7,757,678 B2
(45) Date of Patent: Jul. 20, 2010

(54) LOCOMOTIVE EXHAUST GAS RECIRCULATION COOLING

(75) Inventors: Gregory Alan Marsh, Erie, PA (US); Mahesh Chand Aggarwal, Erie, PA (US)

(73) Assignee: General Electric Company, Schenectady, NY (US)

( * ) Notice: Subject to any disclaimer, the term of this patent is extended or adjusted under 35 U.S.C. 154(b) by 126 days.

(21) Appl. No.: 12/116,773

(22) Filed: May 7, 2008

(65) Prior Publication Data

US 2009/0277428 A1 Nov. 12, 2009

(51) Int. Cl.
F02B 47/08 (2006.01)
F02B 47/00 (2006.01)
(52) U.S. Cl. .................................. 123/568.12
(58) Field of Classification Search ............ 123/568.12, 123/568.11; 60/278, 280, 298, 605.1, 605.2; 701/108; 165/103, 153, 158
See application file for complete search history.

(56) References Cited

U.S. PATENT DOCUMENTS

| | | |
|---|---|---|
| 4,385,496 A | 5/1983 | Yamane |
| 6,516,787 B1 * | 2/2003 | Dutart et al. ................. 123/539 |
| 6,547,159 B1 | 4/2003 | Westby |
| 6,604,515 B2 | 8/2003 | Marsh et al. |
| 6,886,544 B1 | 5/2005 | Bui |
| 2007/0039321 A1 * | 2/2007 | Sheidler et al. ............... 60/599 |
| 2007/0039322 A1 * | 2/2007 | Bering et al. ................. 60/599 |
| 2007/0204614 A1 * | 9/2007 | Kolb ........................... 60/599 |

OTHER PUBLICATIONS

"The Ultimate Solution for EGR," Haldex Hydrolics, http://www.hbus.haldex.com/resources/documents/Varivent.pdf, Accessed May 28, 2008.
U.S. Appl. No. 12/116,775, filed May 7, 2008, Marsh et al.

* cited by examiner

Primary Examiner—Mahmoud Gimie
(74) Attorney, Agent, or Firm—Robert Wawrzyn; Alleman Hall McCoy Russell & Tuttle LLP (57) ABSTRACT

A method of operating an engine having exhaust gas recirculation from an exhaust manifold of the engine to an intake manifold of the engine, the engine in a locomotive or other vehicle car body, the engine further having an intake system turbocharger with an air-cooled intercooler, the method including cooling the exhaust gas recirculation via a first airflow generated by car body motion, cooling compressed engine induction air in the air-cooled intercooler via a second airflow, and cooling the exhaust gas recirculation via the second airflow.

19 Claims, 6 Drawing Sheets

LOCOMOTIVE EXHAUST GAS RECIRCULATION COOLING

BACKGROUND

Engines may utilize recirculation of exhaust gas from the engine exhaust to the engine intake system, referred to as Exhaust Gas Recirculation (EGR), to reduce regulated emissions and/or improve fuel economy. For example, the EGR may displace fresh air to reduce peak combustion temperature, thereby reducing NOx emissions.

When the EGR temperature is too high, e.g., due to high exhaust temperature generated during high load conditions, the EGR may displace the intake air such that there is limited oxygen available for combustion. Likewise, the engine air-fuel ratio may be limited to be less than a threshold value, beyond which combustion may degrade or increased particulate matter emissions may be generated. The limited combustion air, along with the air-fuel ratio limits, can effectively restrict the maximum available fuel injection amount. The restricted fuel injection amount thus leads to reduced available engine output torque and/or power. As such, various approaches may be used in which the EGR is cooled via an EGR cooler that rejects heat to engine coolant to avoid reducing available engine output.

In a locomotive context, however, various issues may arise with the above approaches. For example, a locomotive engine duty cycle may result in excessive heat rejection to the engine coolant, thereby requiring significantly increased engine cooling system size and performance criteria. Further, the locomotive engine duty cycle may also result in significant amounts of deposit buildup, e.g., soot buildup and/or coaking, in the EGR cooler.

SUMMARY

Accordingly, to address at least some of the above issues, a method and system for exhaust gas recirculation cooling in a locomotive engine or other engine is described herein. For example, in one embodiment, a method of operating an engine having exhaust gas recirculation from an exhaust manifold of the engine to an intake manifold of the engine, the engine in a locomotive car body, the engine further having an intake system turbocharger with an air-cooled intercooler, is described. The method comprises: cooling the exhaust gas recirculation via a first airflow generated by car body motion; cooling compressed engine induction air in the air-cooled intercooler via a second airflow; and cooling the exhaust gas recirculation via the second airflow. This may allow reduced (or no) heat rejection to the engine coolant, while taking advantage of airflow for both EGR cooling and intake air cooling, and further taking advantage of airflow generated by car body motion.

This Summary is provided to introduce a selection of concepts in a simplified form that are further described herein. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventors herein have recognized any identified issues and corresponding solutions.

DESCRIPTION OF THE FIGURES

The present invention will be better understood from reading the following description of non-limiting embodiments, with reference to the attached drawings, wherein below.

DETAILED DESCRIPTION

Figure 1:
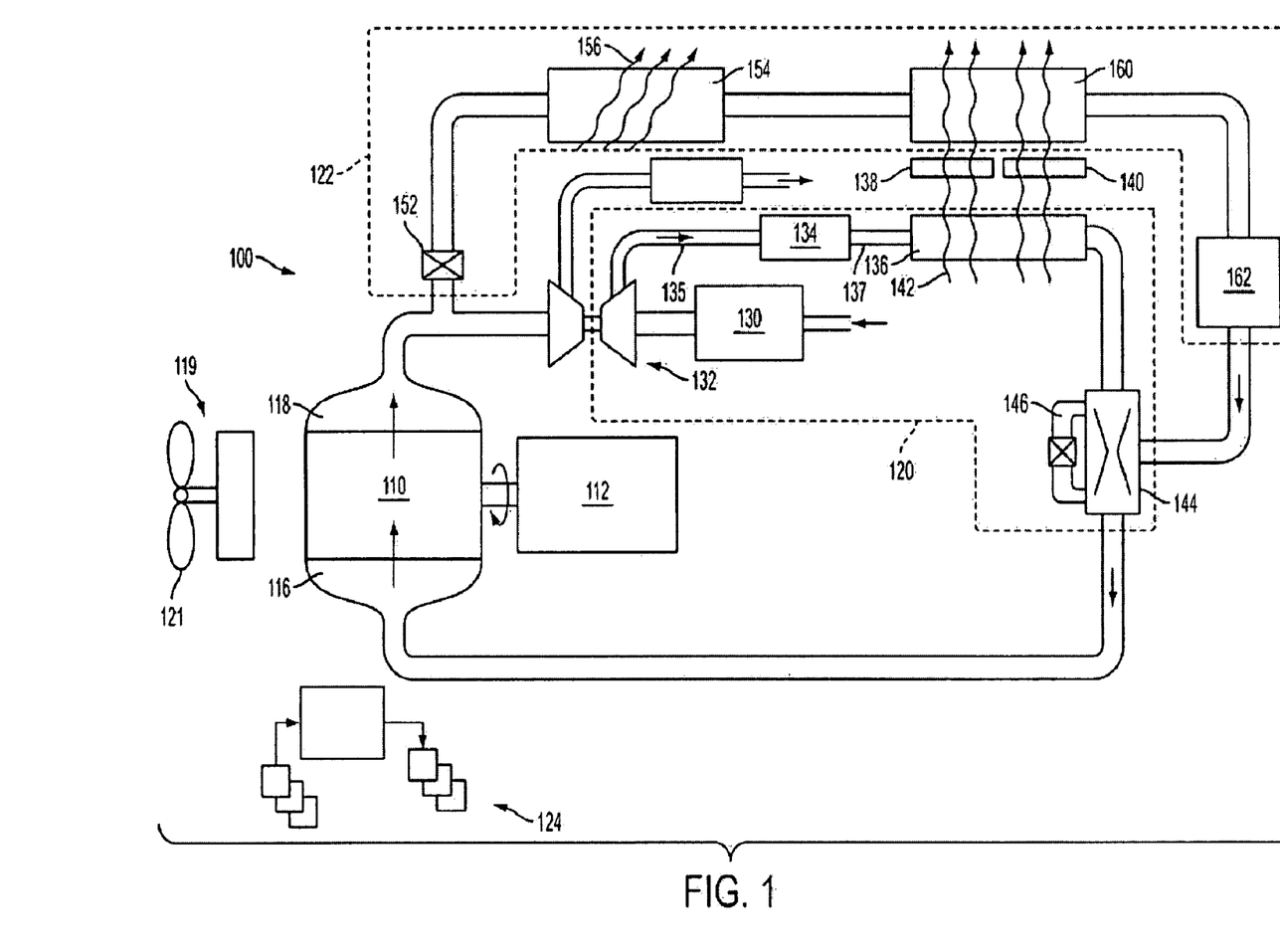
FIG. 1 shows a schematic diagram of a locomotive propulsion system.

Locomotive and other vehicle propulsion systems may include various components to improve performance and reduce regulated emissions. FIG. 1 schematically shows an example system configuration 100 for an engine 110 utilizing boosted induction air and exhaust gas recirculation (EGR), the engine driving a transmission 112. The system 100 may be coupled in a locomotive car body (not shown). Specifically, FIG. 1 shows intake system 120 and EGR system 122 coupled to engine 110. Engine 110 may include a plurality of cylinders coupled between an intake manifold 116 and an exhaust manifold 118. Engine 110 may be configured to perform diesel combustion of diesel fuel delivered via a fuel system (not shown). The combustion may include diffusion combustion, or various other types of engine combustion. The engine and associated components may be controlled via a control system 124.

While FIG. 1 shows a single intake and exhaust system, each engine bank may include a separate exhaust and intake system in one example; and as such each of the various intake system components and/or exhaust system components may be duplicated for each bank. Engine 110 is also shown coupled to a radiator 119, which may include one or more controllable fans 121, for cooling engine coolant with ambient air.

The intake system 120 may include an intake air filter 130 coupled to a compressor of an intake system turbocharger 132 for delivering filtered induction air. The compressor may be adjusted based on operating conditions to adjust a level of induction air boost, using, e.g. a variable geometry turbocharger, and/or a bypass valve for bypassing air around the compressor (not shown). The compressor boosts the induction air, which is then routed to a water-based intercooler 134. Water-based intercooler 134 is configured to transfer energy between engine cooling water (e.g., engine coolant) and the induction air. For example, during low load conditions, the engine coolant may transfer heat to the boosted induction air, thereby raising the temperature of the induction air. However, under higher load conditions, the engine coolant may cool the boosted induction air. Further, water-based intercooler 134 may include engine coolant inlet temperature control to provide a desired coolant temperature level. The system may also include engine coolant temperature control to maintain temperature between temperature limits, using radiator fan 121 airflow changes.

Induction air is delivered from the water-based intercooler 134 to a second intercooler, namely, an air-air heat exchanger 136. In some embodiments, the air-air heat exchanger 136 may include fins (e.g., a finned heat exchanger) to increase the amount of heat that the device can dissipate. In this example configuration, suction fans 138 and 140 force airflow 142 across air-air heat exchanger 136 to cool compressed induction air, and further to the EGR system 122, as described in further detail below. While this example shows two suction fans 138 and 140, a single fan may be used, or further more than two fans may be used. When using a plurality of fans, the fans may be controlled in coordination at a common level, or each fan may be individually controlled by the control system 124. Soot buildup generated by the exhaust gas recirculation may be intermittently removed by adjusting the fan 138 and 140 to decrease the airflow through the air-air heat exchanger 136 and thereby increase exhaust gas recirculation temperature.

Continuing with the intake system 120, induction air is delivered from the air-air heat exchanger 136 to venturi pump 144. Venturi pump 144 operates to draw EGR from system 122 into the intake system, before delivering the induction air and EGR to the intake manifold 116 of engine 110. Various venturi pump configurations may be used, including a bypass configuration in which a controllable venturi pump bypass valve 146 may enable adjustment of the amount of EGR drawn into the intake by the control system 124. In one example, two butterfly valves are used as bypass control valves, one for each bank. In one example, under lower engine load conditions the bypass valve is opened thereby allowing EGR to bypass the venturi pump. However, under higher engine load conditions EGR may be directed through the venture pump. In this manner, bypassing the venturi pump during lower engine load conditions as well as directing the exhaust gas recirculation through the venture pump during higher engine load conditions is possible.

EGR system 122 includes an EGR valve 152 for controlling whether exhaust gas is recirculated from the exhaust manifold 118 of engine 110 to the intake manifold 116 of engine 110. EGR valve 152 may be an on/off valve controlled by control system 124, or it may control a variable amount of EGR, for example. EGR is directed from valve 152 to a first EGR cooler 154, where airflow 156 operates to cool the EGR. In one example, the first EGR cooler 154 includes an external car body cab duct with fins, e.g., a finned heat exchanger, where the airflow 156 is generated by car body motion. In one example, an upstream portion of the first EGR cooler utilizes bared ducts due to the high exhaust temperatures of the exhaust gas (which may damage fins), while a downstream portion utilizes fins. Thus, fins may be added to only a portion of the duct where exhaust gas temperature has decreased to an adequate temperature. Extended fin surface area may begin along the length of bared tubes as the temperature of the EGR gas is reduced along the cooler length. Further, both tube sets (with and without fins) may be sized, shaped, and positioned, to match the geometry of a second and/or third EGR cooler (see below).

The car body may thus generate ram air cooling. Further, first EGR cooler 154 may be positioned near a top of the locomotive car body, where airflow 156 may be drawn in from the sides of the car body and exhausted, past the first EGR cooler 154, out the top of the car body. The first EGR cooler 154 may include longitudinal finned ducts positioned in the car body.

A second EGR cooler 160 cools EGR exiting the first EGR cooler 154. At the second EGR cooler 160, airflow 142 generated by suction fans 138 and 140 flows to the second EGR cooler 160, thereby forcing air on the second EGR cooler 160, after interacting with air-air heat exchanger 136. The second EGR cooler 160 may include finned pipes with end manifolds, e.g., a finned heat exchanger. In one example, by utilizing airflow 142 for cooling the induction air and EGR, the system may be packaged more efficiently in the locomotive car body, and overall cooling system performance may be increased without overly increasing heat rejection to the engine coolant. Further, under some conditions, the airflow temperature exiting air-air heat exchanger 136 is still low enough to provide substantial EGR cooling in the second EGR cooler 160. In this way, the second EGR cooler 160 operates with a high temperature difference between the exhaust and airflow 142. Further, as described in more detail with regard to FIGS. 3-5, the second EGR cooler 160 (as well as the first EGR cooler 154 and the third EGR cooler 162) can be mounted in available space directly above the water-based intercooler 134 and the air-air heat exchanger 136.

Continuing with the EGR system 122, a third EGR cooler 162 is shown downstream of the second EGR cooler 160. Third EGR cooler 162 may include an engine coolant water-cooled shell and tube (e.g., water cooled on shell side) cooler. The third EGR cooler 162 may also be referred to as a liquid coolant engine cooling system. EGR exiting cooler 162 is then delivered to venturi pump 144. EGR exiting venturi pump 144 is mixed with induction air to form a combustion mixture delivered to the cylinder. In this way, EGR avoids traveling through the intercooler 134, air-air heat exchanger 136, turbo discharge duct 135, and intermediate duct 137, to prevent soot laden or sulfuric acid laden gasses from degrading these components. However, in an alternative example, filtered exhaust gas flows through such components.

The above configuration may be modified in various additional ways. For example, the order of cooling through the various coolers in the EGR system may be varied. Additional cooling may also be used. Further still, a Roots blower (not shown) may be used in combination with venturi pumps, where the blower may be mounted between the third EGR cooler 162 and the venturi pump 144.

The exhaust system may further include a particulate filter coupled in the exhaust manifold 118 before the EGR is directed to the EGR system 122. Alternatively, the particulate filter may be located downstream of the EGR system 122. Also, additional emission control devices (not shown), such as NOx catalysts, etc., may also be positioned in the exhaust system.

By utilizing the air-air heat exchanger for cooling air in the intake system 122, and first and second EGR (air-based) coolers 154 and 160 for cooling the EGR, it is possible to reduce the heat rejection to the engine coolant, thereby reducing the size and performance requirements for the radiator fans, and the radiator itself. Additionally, common fans may be used to generate the cooling flow for both the induction air and EGR, thus reducing system components. And, even though airflow 142 is warmed before cooling EGR in the second EGR cooler 154, due to relatively high EGR temperatures under selected operating conditions, sufficient cooling is still achieved.

Further, by utilizing ram air cooling for an upstream cooler (e.g., a first cooler in the direction of EGR flow), even the potentially limited flow generated by car body motion can achieve sufficient heat rejection, due to high temperature differences between EGR and ambient air, at least under some conditions. Also, by locating the duct for the ram air and first EGR cooler 154 at or near the top of the locomotive, it experiences increased airflow 156 since car-body motion is increased at this location, while also allowing access for cleaning/replacement.

The coordinated operation between the induction air cooling and EGR cooling also generates improved overall system operation. Specifically, as noted above, the airflow 142 exiting the air-air heat exchanger 136, although heated above ambient temperature, is still substantially cooler than the EGR temperature during selected operating conditions, even after the EGR is cooled by the first EGR cooler 154.

Figure 2:
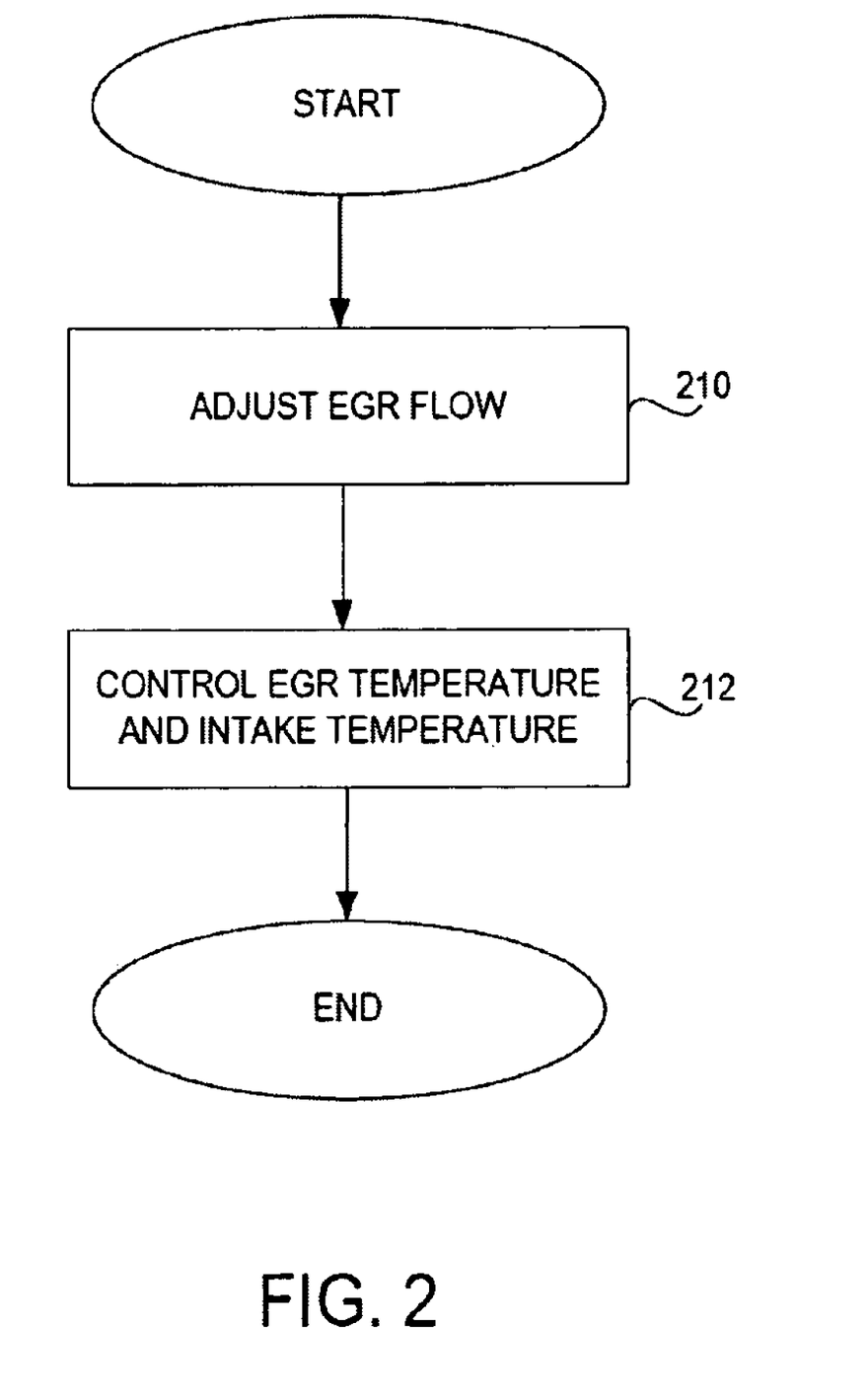
FIG. 2 shows a flow chart of example operation.

Referring now to FIG. 2, a flow chart illustrates example system operation and control for the system of FIG. 1. The operation may be carried out via a routine in a control system coupled in the locomotive, e.g., the control system 124 shown in FIG. 1 or otherwise. The control system may include one or more controllers communicating with various sensors, networks, actuators, etc. The specific routines described herein in the flowchart and the specification may represent one or more of any number of processing strategies such as event-driven, interrupt-driven, multi-tasking, multi-threading, and the like. Further, the routines described herein may be implemented in code programmed into a computer readable storage medium in the control system.

In 210, the routine adjusts the amount of EGR via EGR valve 152 based on operating conditions, such as engine load, engine speed, etc. In one example, the system either allows EGR flow, or blocks EGR, depending on operating conditions. In another example, a level of EGR flow may be adjusted depending on operating conditions. For example, while EGR exit temperatures from the third cooler may remain substantially constant due to coolant temperature control, flow control of the EGR may be obtained from both an on/off valve (e.g., EGR valve 152) and venturi pump bypass valve 146 control, thereby increasing or decreasing the primary airflow through the venturi pumps.

In 212, the routine adjusts various actuators to control induction air temperature and EGR intake manifold inlet temperature, such as by adjusting the radiator fan 121, one or more of fans 138/140, engine coolant flow to the third EGR cooler 162 and/or water-based intercooler 134. For example, the system may be adjusted to maintain EGR temperature exiting the EGR system (and entering the intake manifold) above its dew point, and further to maintain engine air inlet combustion mixture temperatures above its dew point. Such coordinated control may be used to reduce sulfuric acid condensation.

As one example, if EGR temperature is below a threshold (e.g., it may cool below its dew point), it is possible to adjust fans 138/140 to reduce cooling, thereby increasing both induction air temperature, EGR temperature, and combustion air mixture temperature.

As another example, fans 138/140 may be adjusted to maintain mixture air temperature, and such control may be synchronized with EGR temperature control. At engine loaded conditions, increased induction air cooling and increased EGR cooling, via increased fan operation of fans 138/140, may both generate improved performance since both may require increased heat rejection.

Figure 3:
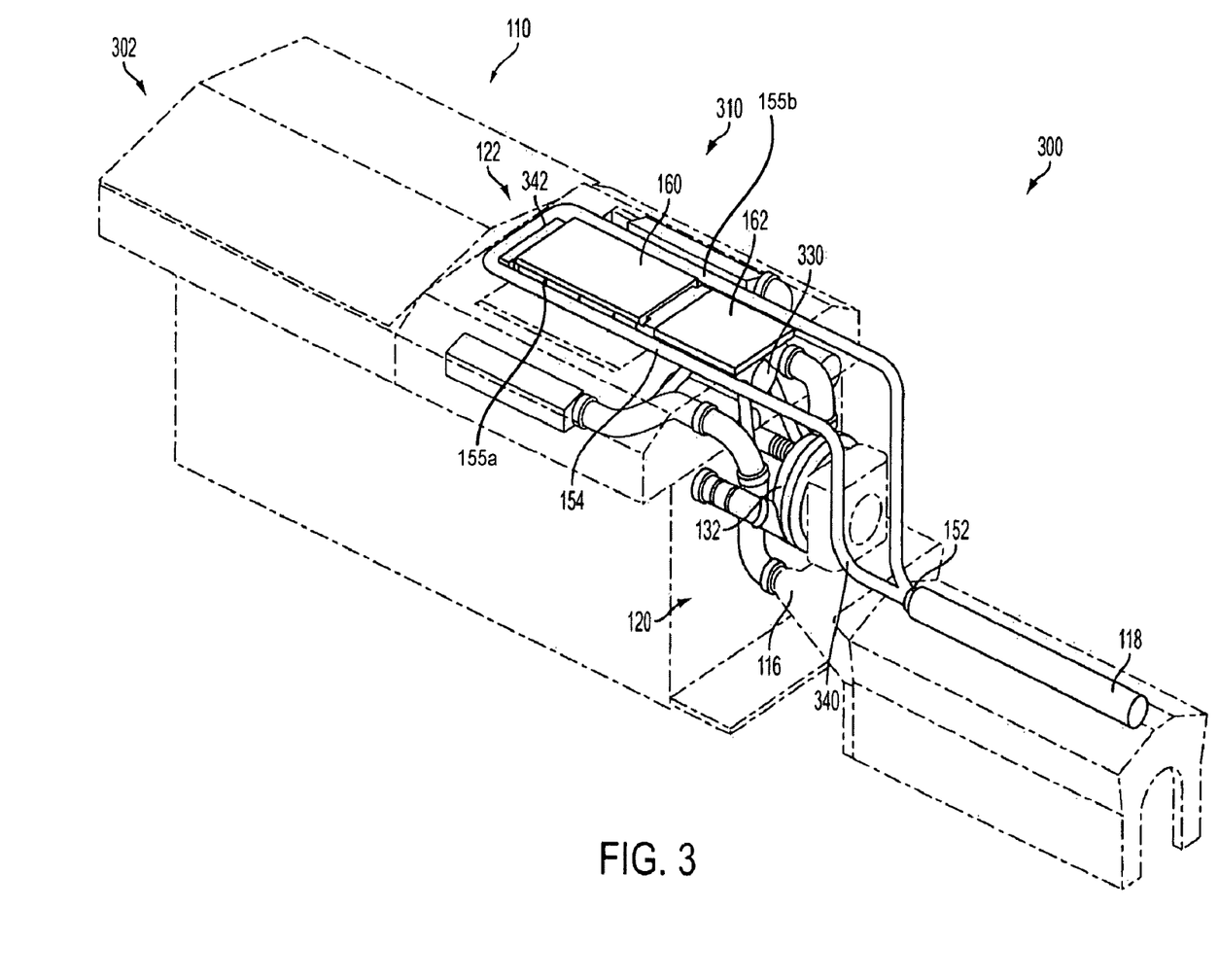
FIG. 3 shows an approximately scale isometric view of a locomotive propulsion system.
Figure 4:
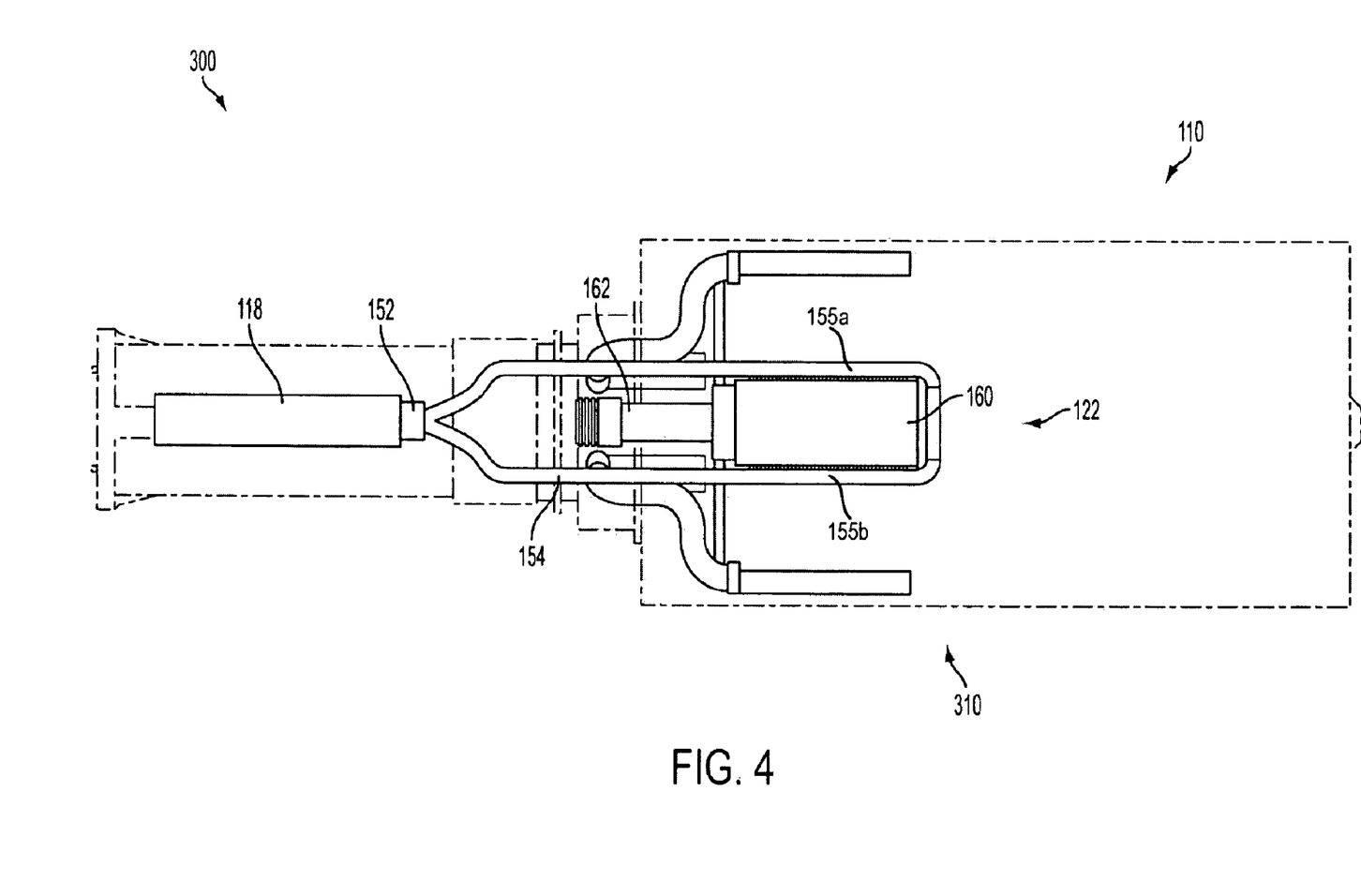
FIG. 4 shows a top view of the locomotive propulsion system of FIG. 3.
Figure 5:
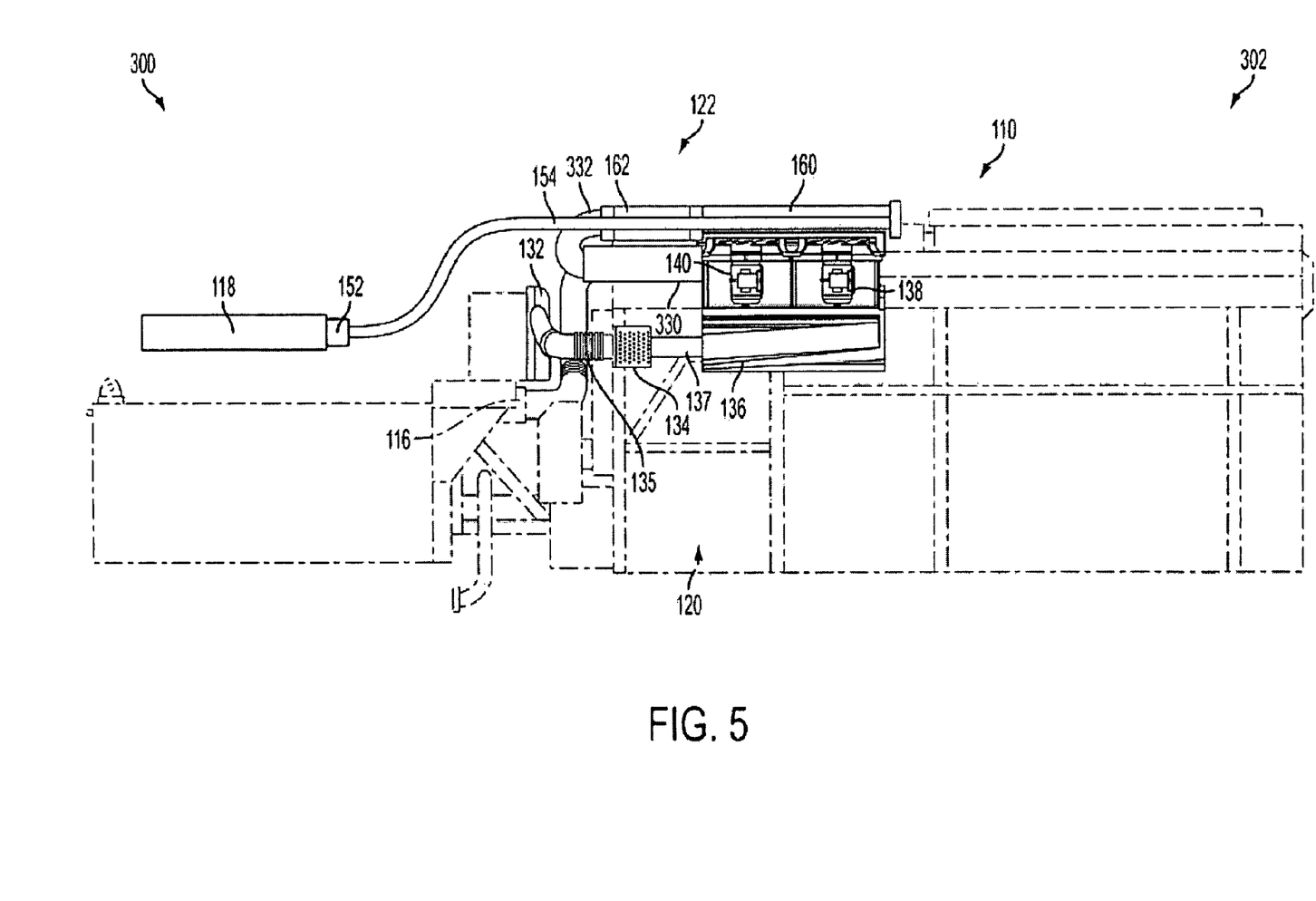
FIG. 5 shows a side view of the locomotive propulsion system of FIG. 3.

Referring now to FIG. 3, it shows an approximately scale isometric view of a locomotive propulsion system 300, and FIGS. 4 and 5 show a side view and top view of the locomotive propulsion system, respectively, with common components labeled with common numbers in reference to FIG. 1.

Specifically, FIGS. 3-5 illustrate how the first, second, and third EGR coolers (154, 160, and 162, respectively) are configured in an EGR system package 310, which is configured at or near a top of the locomotive car body along with ducting for mounting on an engine cab and radiator roof structure. Such a configuration makes use of available space directly above the water-based intercooler 134 and air-air heat exchanger 136 so that three EGR coolers and a venturi pump can be mounted in a common location and in a common package. Further, as noted, the EGR system package 310 can be removably mounted and/or coupled in the locomotive so that the EGR system package can be removed/replaced for maintenance, such as for cleaning soot buildup, as described further below.

FIG. 3 shows exhaust manifold 118 positioned longitudinally relative to the locomotive car body 302. The exhaust manifold 118 is fluidly coupled to EGR valve 152. In one example, a single EGR valve 152 may be included in the system with a tee-output connection to each bank's EGR package. The exhaust manifold 118 may further include a diesel particulate trap (not shown). In an alternate embodiment, the diesel particulate trap may be removed.

The first EGR cooler 154 is fluidly coupled to EGR valve 152 by flexible, detachable, metal hose connections 340. The flexible metal hose connection(s) 340 branches out, extending outward and upward at an angle and tapering off as it reaches the first EGR cooler 154, to generally form an S-shape, although other shapes may also be used. Alternatively, a combination of solid piping and flexible metal couplings may be used. By providing the S-shaped hose with some flexibility, it may be possible to better buffer movement between the engine 110 and EGR system package 310.

The first EGR cooler 154 is positioned near a top of the locomotive car body and extends longitudinally along the length of the locomotive car body. The first EGR cooler 154 is coupled to the second EGR cooler 160 by an inlet header 342 including turning vanes (not shown). The turning vanes allow the EGR to reverse direction and travel longitudinally along the locomotive car body through the second EGR cooler 160. The second EGR cooler 160 may include two distinct channels, one for each bank. EGR flow continues longitudinally along the locomotive car body to the third EGR cooler 162. As shown in FIGS. 3-5, the first, second, and third EGR coolers are substantially co-planer in their mounting configuration to form a compact EGR system package.

EGR flow exiting the third EGR cooler 162 is routed inward and downward to venturi pump duct assembly 330 via ducting 332. Additionally, a detachable ducting connection (not shown) may be used to couple the venturi pump 144 to the intake manifold 116. As shown in FIGS. 3-5, space located vertically above the turbocharger compressor inlet duct may be used to allow routing to return ducting of the EGR flow for each of the engine banks. Further, the venturi pump 144 for each bank may be mounted in a single venturi pump duct assembly. The venturi pump duct assembly 330 may also house ducting to route EGR from the exit of ducting 332 to the venturi pumps 144, and then to intake manifold 116. For example, the venturi pumps 144 may be internal to the venturi pump duct assembly 330. The venturi pump duct assembly 330 may also house the venturi bypass valves 146 that enable bypassing of the venturi pump of each bank. Finally, as noted above, the EGR valve 152 may also be mounted in venturi pump duct assembly 330.

Further, the venturi pump duct assembly 330 may be coupled to an outlet duct of air-air heat exchanger 136, where the outlet ducts are angled downward to facilitate the connection and packing configuration. Specifically, the return ducts may angle down from the exit of the air-air heat exchanger 136 to the EGR venturi pump exit to allow the third EGR cooler 162 to be over the top of the two return ducts. In one example, V-band quick connect metal couplings (not shown) may be used to attach the third EGR cooler to the car body. Additionally, lifting brackets may be coupled to the third EGR cooler allowing for easier removal from the car body.

The first EGR cooler 154 may include a longitudinal finned duct to facilitate car body motion cooling. As one example, under typical operating conditions, a temperature difference of approximately 1100° F. to ambient air would enable a heat rejection of approximately 8000 BTU/min (4000 per bank) for an outlet exhaust temperature of approximately 900° F.

The second EGR cooler 160 may include a finned pipe with end manifolds. At typical conditions, a temperature difference between the EGR and airflow 142 would be approximately 900° F., which would enable a heat rejection of approximately 11000 BTU/min for an outlet exhaust temperature of 600° F.

Finally, the third cooler 162 may include a steel shell and tube heat exchanger, with water (coolant) on a shell side. Heat rejection through the third cooler under typical conditions would be approximately 11000 BTU/min. In one embodiment, EGR gas flows through stainless steel bare tubes with stainless tube sheets and with investment cast header ends (and with built-in turning vanes, as casted). The length of the tube may be adjusted based on the desired amount of heat rejection. In one example, the length is approximately 2 meters. Also, while a single cooler may be used, the third EGR cooler 162 may also include a plurality of smaller diameter and/or shorter coolers than shown in the figures. A single pass water side flow may be directed across the tubes to regulate the outlet temperature of the third cooler in a passive manner via the engine coolant temperature control provided by the radiator system. In one example, the third EGR cooler may include upset internal fins (not shown) allowing the heat transfer coefficient to be increased.

In one embodiment, suction fans 138/140 may be offset towards the exit of the second cooler exit to promote the use of the higher EGR entering temperature to the heat exchanger. This also improves airflow across the higher pressure drop region of the second EGR cooler heat exchanger tubes (e.g., the finned tube section).

Various modifications may be made to the configuration illustrated. For example, the EGR valve 152 may also be mounted adjacent the venturi pump 144, and within the venturi pump duct assembly 330.

Figure 6:
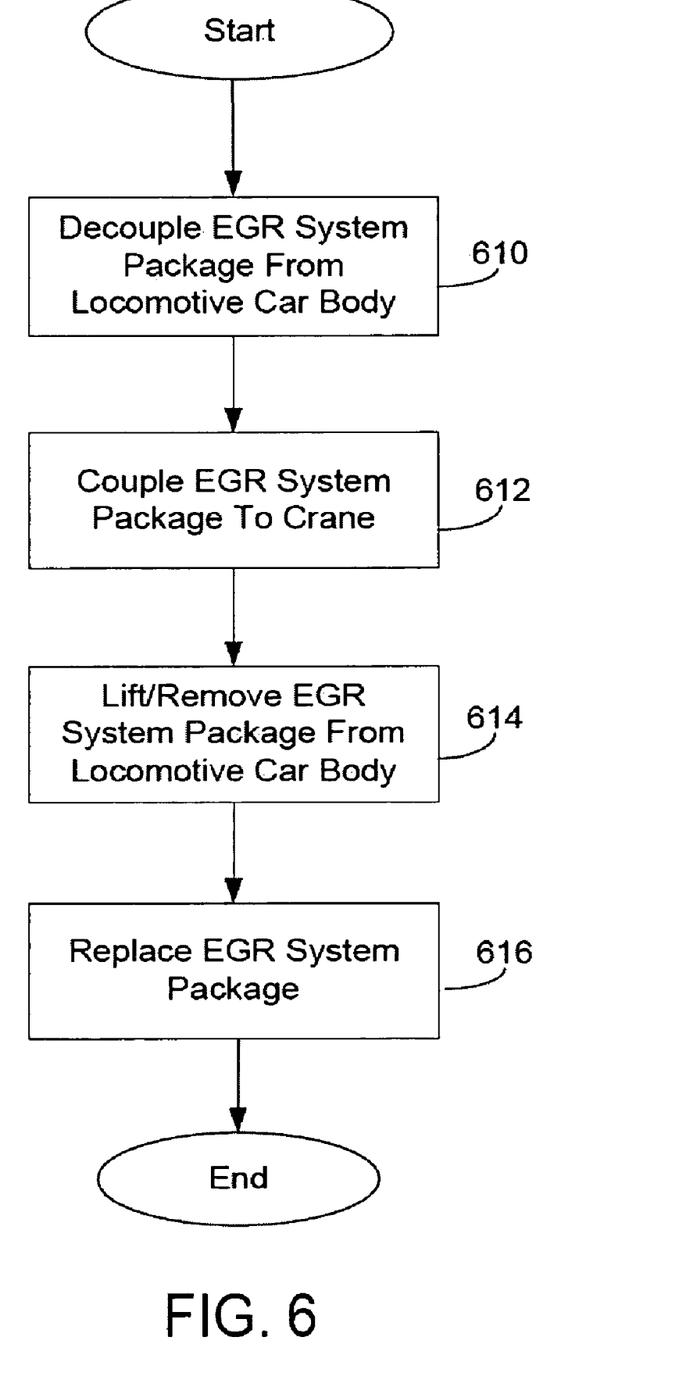
FIG. 6 shows a flow chart illustrating an exhaust gas recirculation replacement/cleaning method.

Referring now to FIG. 6, a flow chart illustrates one example of an EGR packaging maintenance procedure. While this example illustrates replacement of the EGR system package 310, in an alternative embodiment the engine may be operated in a cleaning mode to remove soot buildup, for example. In the cleaning mode, the controller may turn off suction fans 138/140 and increase EGR temperatures, thereby burning off soot in the second and third EGR coolers 160 and 162.

Returning to FIG. 6, additional details of a maintenance method are illustrated. The method may be carried out at periodic intervals, such as after a prescribed operating duty cycle. At 610, the EGR system package is decoupled from the locomotive car body. For example, the EGR system package may be decoupled at the EGR control valve 152 and at the outlet of the venturi pumps 144. Then, at 612, the de-coupled EGR system package may be coupled to a crane, which at 614 lifts the EGR system package vertically from the locomotive car body. Then, at 616, the system may be replaced with a fresh EGR system package. In this way, it is possible to quickly remove and install the EGR system package.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A method of operating an engine generating exhaust, the engine in a vehicle body, the engine further having an intake system turbocharger with an air-cooled intercooler, the method comprising:

drawing exhaust gas recirculation from upstream of a turbine of the turbocharger;

cooling the exhaust gas recirculation via a first airflow generated by vehicle body motion;

cooling compressed engine induction air in the air-cooled intercooler via a second airflow;

further cooling the exhaust gas recirculation via the second airflow; and delivering the further cooled exhaust gas recirculation to the cooled compressed engine induction air downstream of the intercooler and downstream of a compressor of the turbocharger, wherein the second airflow cools the exhaust gas recirculation while the exhaust gas recirculation is separate from the compressed engine induction air.

2. The method of claim 1 where the exhaust gas recirculation is cooled via the first airflow at a finned heat exchanger located at a top of the vehicle body, where the vehicle body includes a locomotive car body.

3. The method of claim 1 where the exhaust gas recirculation is cooled by the second airflow, via a finned heat exchanger, after the exhaust gas recirculation is cooled by the first airflow.

4. The method of claim 3 further comprising generating the second airflow via at least one fan.

5. The method of claim 4 where the second airflow first cools the induction air and then cools the exhaust gas recirculation.

6. The method of claim 5 further comprising adjusting the fan to adjust an amount of the second airflow for both exhaust gas recirculation vehicle body cooling and compressed engine induction air cooling based on at least an operating condition.

7. The method of claim 1 further comprising cooling the exhaust gas recirculation via engine coolant after cooling the exhaust gas recirculation via the first airflow and the second airflow.

8. The method of claim 7 further comprising forcing the exhaust gas recirculation to an engine intake manifold via a venturi pump, subsequent to cooling the exhaust gas recirculation.

9. The method of claim 8 further comprising bypassing the venturi pump during a first engine load condition, and directing the exhaust gas recirculation through the venturi pump during a second engine load condition, the second engine load condition higher than the first engine load condition.

10. The method of claim 1 further comprising inducting the first airflow at a side of the vehicle body, and exhausting the first airflow at a top of the vehicle body.

11. The method of claim 1 further comprising cooling the compressed engine induction air via a water-based intercooler before cooling the compressed engine induction air via the air-cooled intercooler.

12. The method of claim 1 further comprising adjusting an amount of exhaust gas recirculation based on an engine operating condition.

13. A system for a vehicle body, comprising:

an internal combustion engine having an intake and an exhaust;

a liquid coolant engine cooling system;

a turbocharger having a turbine and a compressor, the turbine coupled in the engine exhaust and the compressor coupled in the engine intake, the turbine coupled to the compressor;

a first intercooler coupled in the engine intake downstream of the compressor, the first intercooler having a first heat exchanger fluidically coupled to the liquid coolant engine cooling system;

a second intercooler coupled in the engine intake downstream of the first intercooler, the second intercooler having a second heat exchanger;

an exhaust gas recirculation system coupled between the engine intake and the engine exhaust, the exhaust gas recirculation system coupled to the engine exhaust upstream of the turbine, and coupled to the intake downstream of the second intercooler;

a first exhaust gas recirculation cooler coupled in the exhaust gas recirculation system;

a second exhaust gas recirculation cooler coupled in the exhaust gas recirculation system downstream of the first exhaust gas recirculation cooler; and a fan configured to force air to the second heat exchanger and then to the second exhaust gas recirculation cooler to transfer heat from both induction air and the exhaust gas recirculation.

14. The system of claim 13 where the first exhaust gas recirculation cooler is an air-cooled cooler.

15. The system of claim 14 where the first exhaust gas recirculation cooler is configured to direct cooling air to an exterior of the vehicle, and where the cooling air is driven by vehicle body motion.

16. The system of claim 13 further comprising a third exhaust gas recirculation cooler fluidically coupled to the liquid coolant engine cooling system.

17. The system of claim 13 where the first exhaust gas recirculation cooler is configured to be coupled in the vehicle at a top of the body, the system further comprising a controller, the controller adjusting a flow of the exhaust gas recirculation and further adjusting fan operation responsive to an engine operating condition.

18. A method of recirculating exhaust gas from an exhaust of an engine to an intake of the engine, in a vehicle body, the engine further having a turbocharger system with an air-cooled intercooler, comprising:

directing exhaust gas recirculation from the exhaust upstream of a turbine of the turbocharger system to the intake downstream of the intercooler and downstream of a compressor of the turbocharger system;

cooling the exhaust gas recirculation via a first airflow generated by vehicle body motion, the exhaust gas recirculation cooled at a first heat exchanger located at a top of the body;

cooling compressed engine induction air in the air-cooled intercooler via a second airflow generated by at least one fan; and cooling the exhaust gas recirculation via the second airflow, the exhaust gas recirculation cooled by the second airflow via a second heat exchanger after the compressed engine induction air is cooled by the second airflow; and adjusting the at least one fan responsive to a temperature of the exhaust gas recirculation.

19. The method of claim 18 further comprising intermittently removing soot buildup generated by the exhaust gas recirculation by adjusting the at least one fan to decrease the second airflow and thereby increase exhaust gas recirculation temperature.

\* \* \* \* \*